6 Sheets—Sheet 1.

R. P. LUDWIG.
Manure-Drill.

No. 227,174.  Patented May 4, 1880.

WITNESSES
G. Nottingham
A. W. Bright

INVENTOR
R. P. Ludwig
By Leggett and Leggett,
ATTORNEYS

R. P. LUDWIG.
Manure-Drill.

No. 227,174.  Patented May 4, 1880.

6 Sheets—Sheet 6.

R. P. LUDWIG.
Manure-Drill.

No. 227,174.  Patented May 4, 1880.

WITNESSES
E. Hottingham
A. W. Bright

INVENTOR
R. P. Ludwig
By Leggett & Leggett
ATTORNEYS

UNITED STATES PATENT OFFICE.

ROMULUS P. LUDWIG, OF EDENBURG, VIRGINIA.

MANURE-DRILL.

SPECIFICATION forming part of Letters Patent No. 227,174, dated May 4, 1880.

Application filed December 11, 1879.

*To all whom it may concern:*

Be it known that I, ROMULUS PHILIP LUDWIG, of Edenburg, in the county of Shenandoah and State of Virginia, have invented certain new and useful Improvements in Manure-Drills; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to certain improvements in manure-drills, whereby barn-yard manure may be distributed in a well-decomposed condition. The several chambers are adapted to distribute the different composts and fertilizers used in agriculture with the grains or seeds used jointly with the different manures or composts.

The invention consists of the parts and combination of parts hereinafter described and claimed.

Figure 1:
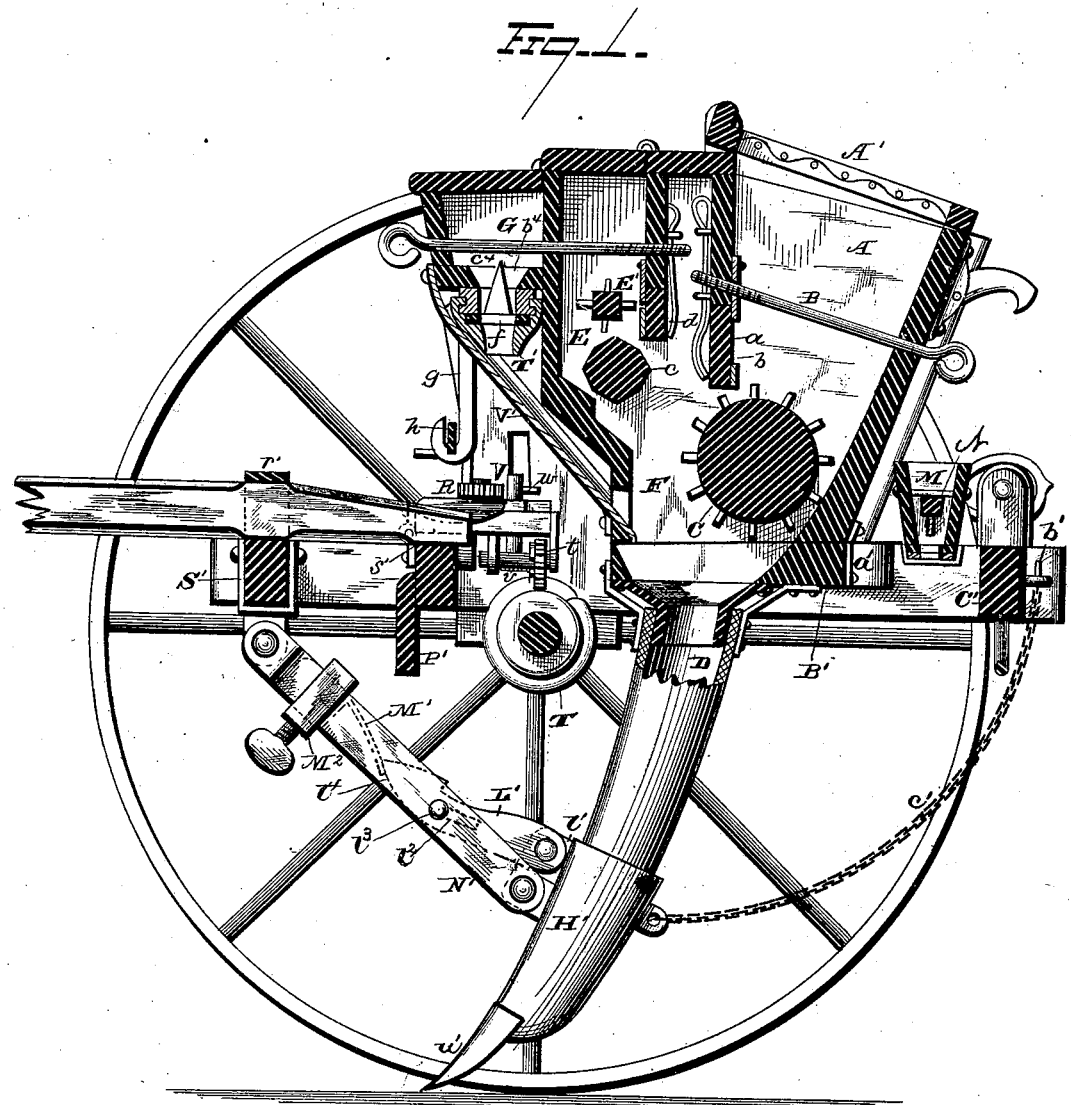
Figure 2:
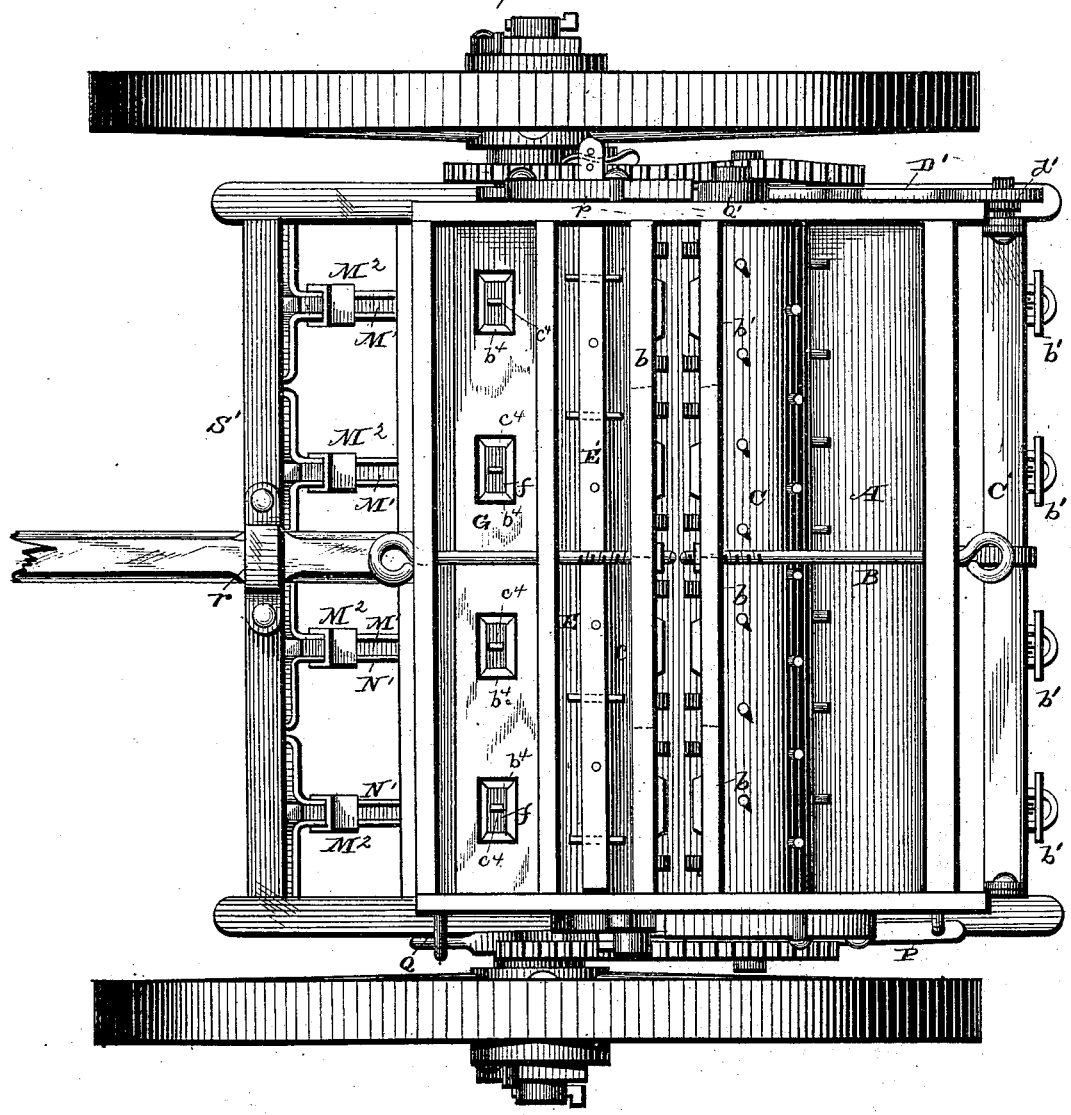
Figure 3:
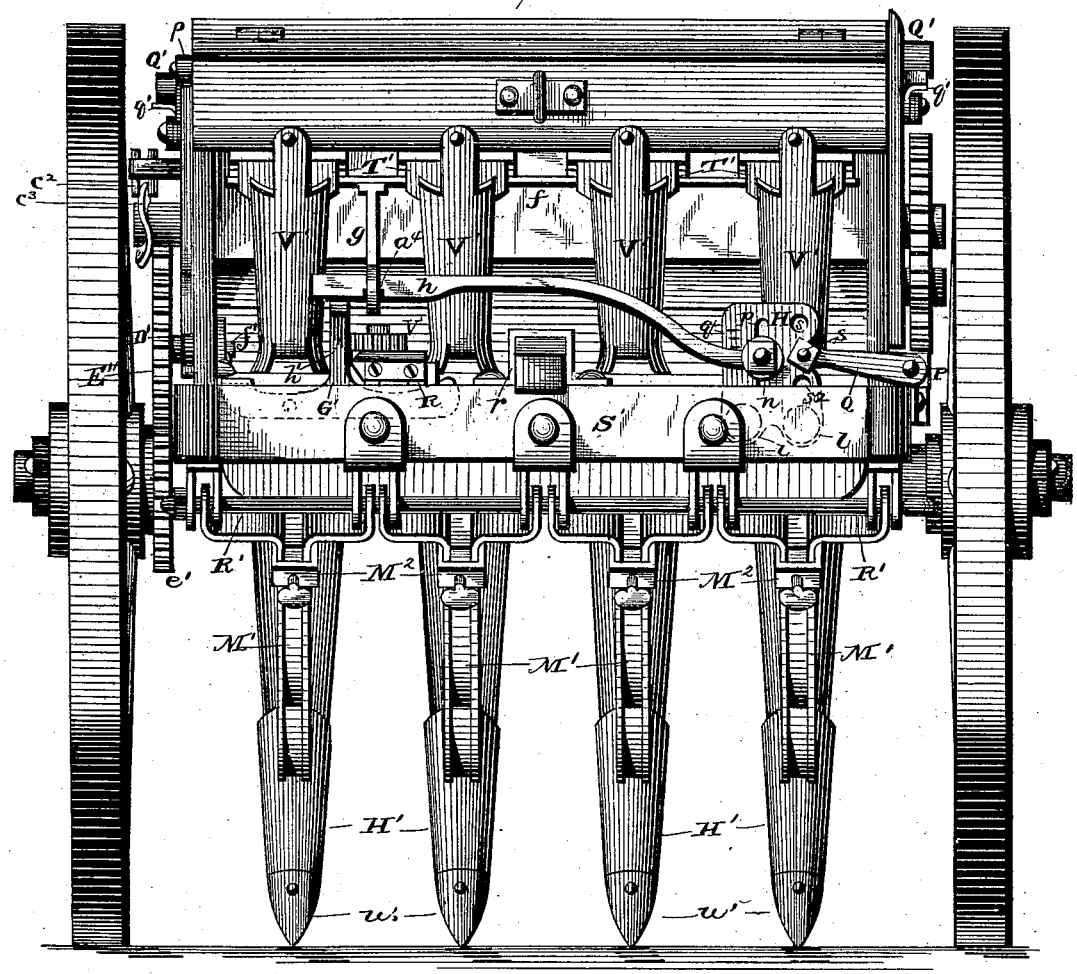
Figure 4:
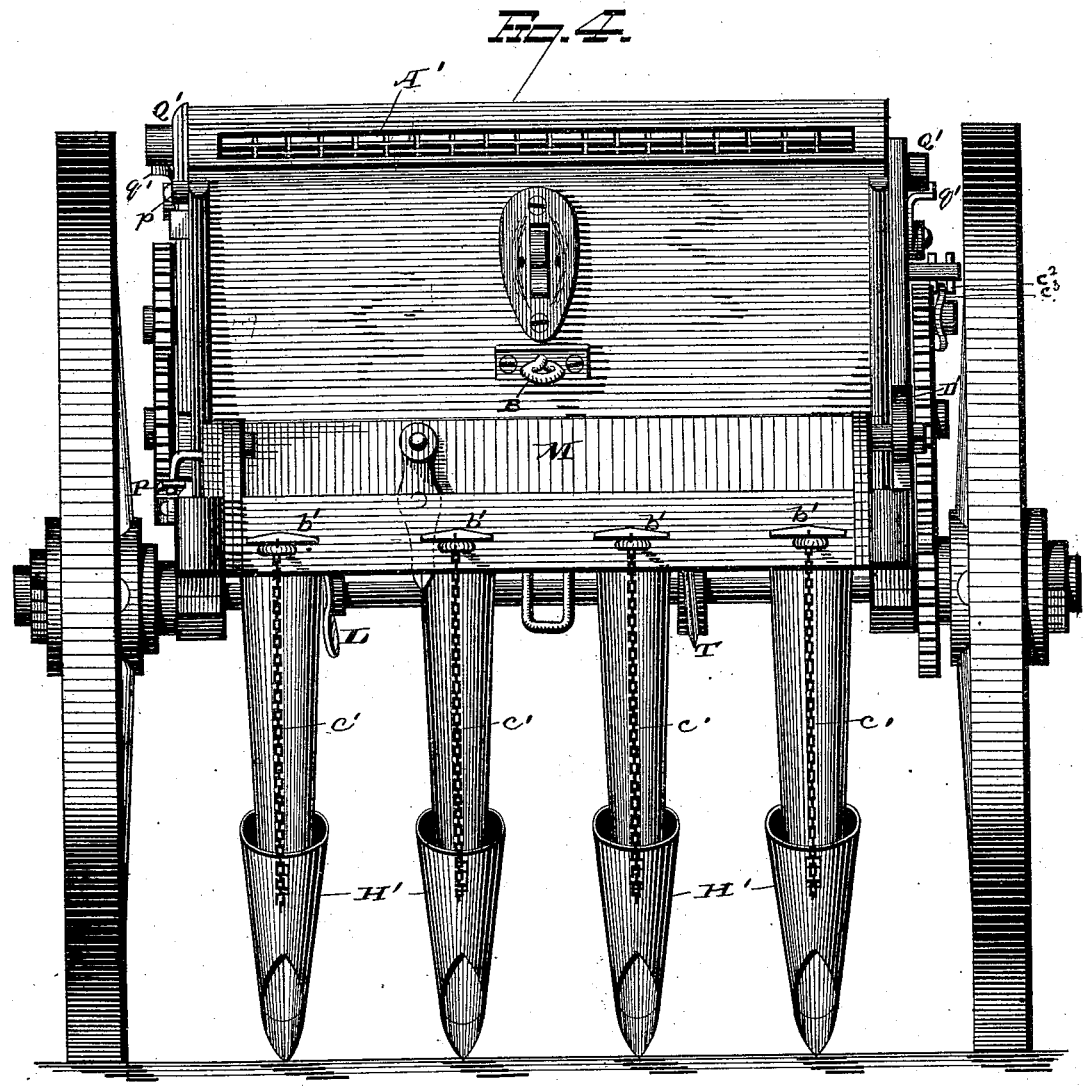
Figure 5:
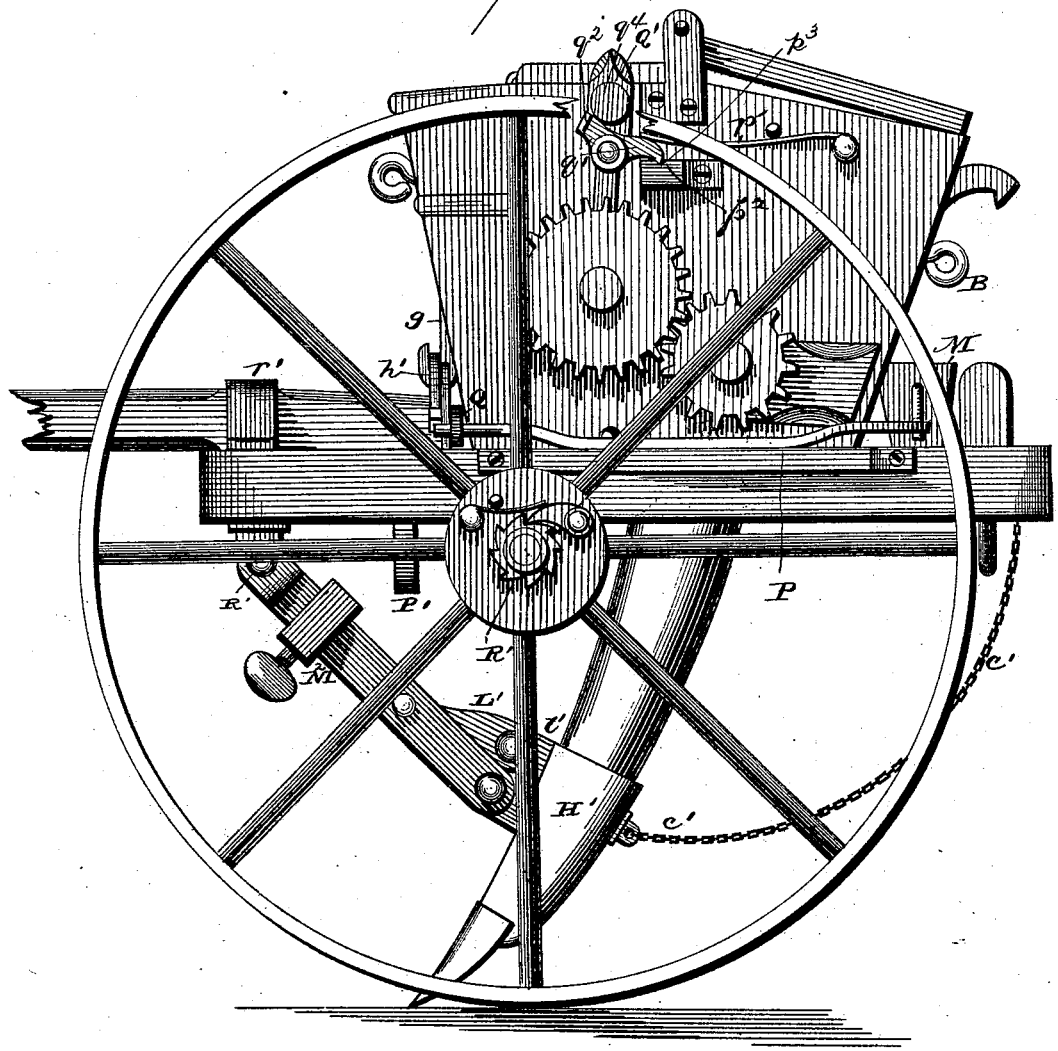
Figure 6:
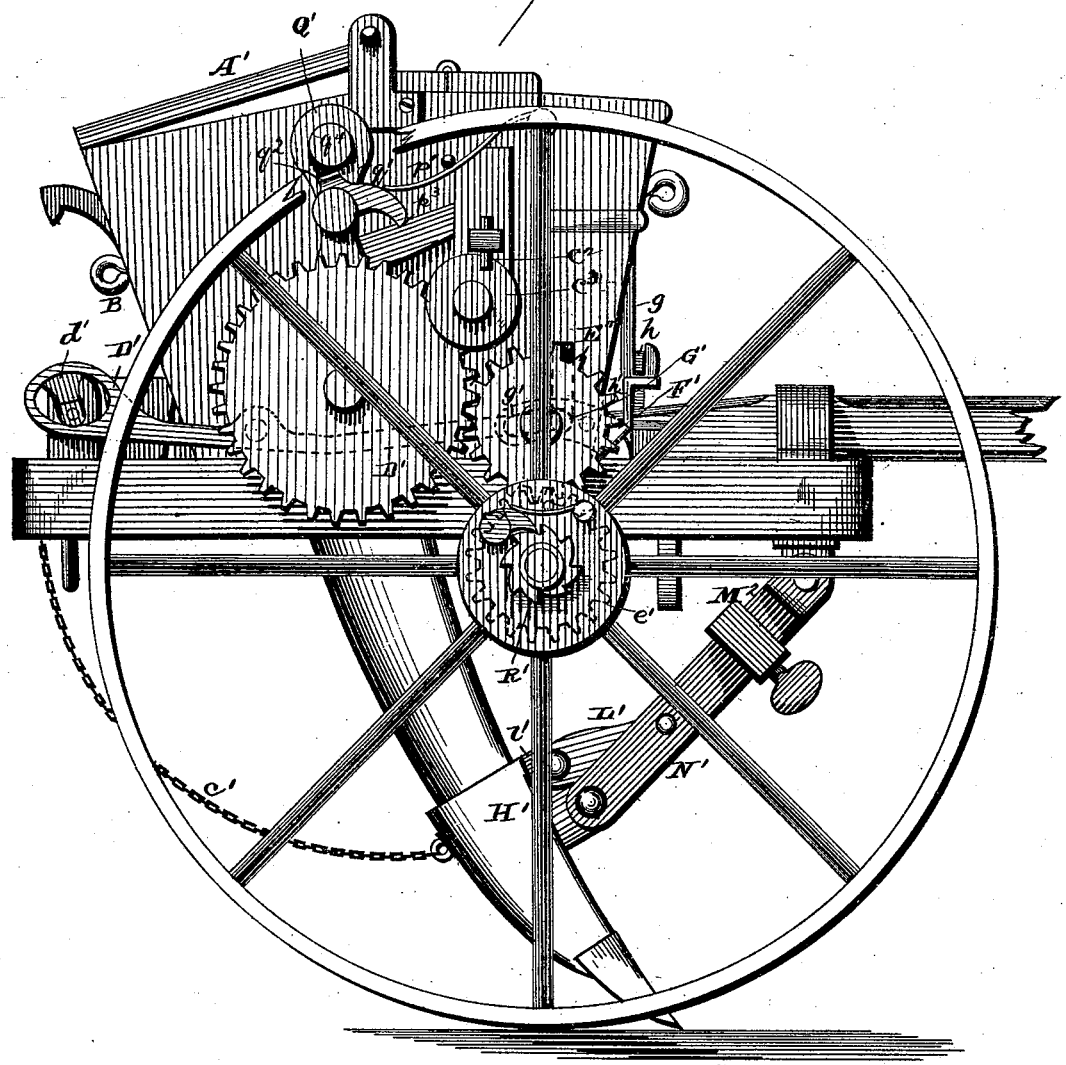

In the drawings, Figure 1 is a longitudinal vertical section. Fig. 2 is a plan view with the covers of the chambers removed. Fig. 3 is a front elevation. Fig. 4 is a rear elevation. Fig. 5 is an elevation of one side. Fig. 6 is a similar view of the opposite side.

The manure-chamber A is provided with a spring sectional regulator, $a$, controlled by a set-rod, B. The sections $b$ may be more or less in number than those shown in the drawings, and are independent each of the other. This regulator permits the escape of such foreign substances as may come in contact therewith, its sections being provided with springs which yield to any material harder than manure, and permit said material to escape without injury to the machine.

The manure-chamber is further provided with a picker-roller, C, located in its bottom, and furnished with any desired number of spikes, teeth, or knives, secured thereto in any suitable manner. This roller crushes or grinds the substance designed to be used, and distributes it regularly into the delivery-spouts D. The latter, located in the lower portion of the machine, convey the ground substance separately or jointly with the seed into the furrow.

The central chamber, E, intended for fine substances, is provided with roll $c$. The latter may be made polygonal in cross-section, as shown in the drawings, or may be provided with projections or studs. This roll guides and feeds the fine fertilizing substance into the main receiving-chamber F.

The fine-fertilizer chamber is provided with a spring sectional regulator, $d$, adapted to operate and be controlled in like manner with the regulator for the manure-chamber. Located in the bottom of this chamber, roll $c$ pulverizes and distributes the substance used with regularity, and prevents packing.

A longitudinal reciprocating stirrer, E', is located above roll $c$, and is provided at one extremity with depending lugs $c^2$, between which works a cam-wheel, $c^3$, secured to the corresponding projecting extremity of the roll. This stirrer agitates the mass in the chamber, so that the substance may come in contact with the roll $c$, and for this purpose the stirrer may be suitably provided with combs or pins.

Chamber G is adapted for wheat or other grain, and is provided with a slide, $f$, located in its bottom. This slide has a longitudinal reciprocating movement, and is provided with a depending hook, $g$, which engages with a notch, $a^4$, formed on the under side of lever $h$.

In the openings $b^4$, formed in the bottom of chamber G, work the upright studs $c^4$, formed on slide $f$. Lever $h$, which is pivoted to a cross-bar of the frame at its lower extremity, is provided with anti-friction rollers $l$. A cam-wheel, L, secured to the axle of the machine, works between said anti-friction rollers and actuates the upper extremity of the plate, so as to give the lever a longitudinal reciprocating movement, Fig. 3. A sliding fastening device, $n$, secures the end of the lever in a vertical slot, $p$, formed in the fulcrum-plate. This plate may be provided with a gage or index, $q$, and the vertical adjustment of the lever therewith regulates the quantity of seed discharged.

The grass-seed chamber H is provided with a longitudinal reciprocating slide, N, having depending pins, which work in or over the slots formed in the bottom of said chamber. Said pins force out the seed through the slots, and also clear the latter of dirt or chaff, which would otherwise choke them up. A vibrating lever, P, connects one end of this slide with an arm, Q, the latter being adjustably connected to the fulcrum-plate by a bolt, $s$, fitting in a vertical series of holes, $s^2$, formed in said plate.

The land-measure R is adapted to show the number of acres of land seeded, and is hinged at its forward extremity to a cross-bar of the frame. A worm, T, secured to the machine-axle, rotates a cog-wheel, $t$, journaled in the hinged measure. Cog-wheel $t$ operates a cog-wheel, $v$, having an upright shaft, provided with a pointer, $w$, which latter moves a cog-wheel, U, the distance of one of its cogs for every complete revolution of said pointer. These cog-wheels and connecting parts may be made in proportion, so that cog-wheel U may indicate any predetermined surface of land. Preferably I make the same so that each cog of wheel U may indicate an acre of sowed land, and in such case the position of the pointer on the face-plate will indicate the fraction of an acre.

The manure-chamber is provided with a hinged sieve or screen, A', which cleans the lime of stone or other substances which would injure the machine.

To prepare the machine for top-dressing purposes, disengage the spout-bottom B' by removing fastening $a'$, which leaves the main receiving-chamber previously referred to open. Disengage the cross-bar $b'$, which connects the chains $c'$ to the chain or hoist bar C'. By turning said hoist-bar the cam $d'$ on one of its extremities operates a pivotal lever, D', which latter disengages cog-wheel E'' from cog-wheel $e'$, secured to the machine-axle. Said cog-wheel E' is journaled on the forward extremity of lever D', and is provided with an inwardly-projecting stud, $f'$, which works in a slot, $g'$, formed in the pivotal plate F'. As wheel E'' is thrown up in disengagement from the axle cog-wheel, said pivotal plate is operated, and its lower extremity depresses the connecting end lever, G', the free extremity of the latter raising the hinged measure R, so as to throw the latter out of operation. An upright arm, $h'$, on lever G' raises lever $h$ and disconnects it from slide $f$. Said operative parts being thus thrown out of action, the machine may be adapted for any desired top-dressing purpose.

The spring hoes or boots H' are made of malleable iron in preference to cast-iron. Each hoe is riveted together, and is designed for a pin or a spring.

The pin break attachment consists of a pin passing through the stock, and is intended for use when necessary, or in case the spring breaks the pin can be used without loss of time in repairing the spring.

Lever L' has its rear extremity pivoted to the hoe, while its central portion is provided with longitudinal slot $l^2$, through which passes a rivet, $l^3$, by which the lever is pivoted to the drag-bar N'. The under side of the forward extremity of the lever is formed with an upward incline, $l^4$, against which the rear extremity of spring-bar M' has free sliding bearing. An adjustable clamp, $M^2$, regulates the tension of this spring, the latter yielding when the hoe comes in contact with obstructions. The hoe thus clears the obstacle, resumes its former position in line with the other hoes, and at the same time continues its distributing. The point $u'$ of the hoe forms the furrow for the seed and composts. The guard-board P' prevents the boots or hoes from tearing or crushing the tubes or spouts.

Hand-levers Q' on both sides of the machine ungear such parts as are not desired to be in active operation. Springs $p'$ hold said hand-levers in position by means of the catches $q'$. These gravity-catches $q'$ are respectively pivoted to the hand-levers, and are adapted to engage with notches $p^3$, formed in lugs $p^2$, which project laterally from the machine-frame. Stems $q^2$, formed on the catches, are adapted to engage with studs $q^4$, projecting laterally from the levers, when the catches are released from lugs $p^2$.

In practice I use a shield or casing (not shown in the drawings) to protect the exterior side gearing.

Ratchets R' on the wheel-spindles permit of a center draft on the machine and cause the wheels to be the actuating power; also permit the machine to continue distributing while turning either to the right or the left. It is apparent that when the machine is moved backward the ratchets throw the operative parts out of gear, and throw them again in gear when the machine is moved forward.

The draft-pole may pass through a clamp, $r'$, and fit in a notch, $s'$.

A rod, R', detachably connects the drag-bars with the drag-bar holder S', so that said drag-bars may be disengaged when the machine is desired for top-dressing.

The wheat or seed cups T' connect with the main receiving-chamber by tubes V'. The grass-seed slide is held in position by pins, upon the removal of which said slide may be removed from the machine.

The several chambers of the machine are respectively provided with hinged covers.

Having fully described my invention, what I claim as new, and desire to secure by Letters Patent, is—

1. The combination, with lever G', provided with upright $h'$, lever $h$, having notch $a^4$ on its under side, and pivotal plate H, of slide $f$ and depending hook $g$, which fits in said notch, substantially as set forth.

2. The combination, with lever D', provided with stud $f'$, pivotal plate F', and lever G', provided with upright $h'$, of lever $h$ and slide $f$, provided with arm $g$, substantially as set forth.

3. The combination, with the hoe, of the drag-bar, pivoted at one end to the hoe and at its opposite end to the machine-frame, of the lever L', pivoted at one end to the hoe and provided with an elongated slot in its free end, through which is inserted a bolt or rivet connected with the drag-bar, and a spring, M', the free end of which bears upon the tapered end of said lever L', substantially as set forth.

4. The combination, with hoist-bar C', provided with cam $d'$, lever D', and wheel E'', journaled on the latter, of stud $f'$, secured to said lever, and pivotal plate F', substantially as set forth.

5. The combination, with the hoe, the drag-bar, pivoted at one end to the hoe and at its opposite end to the machine-frame, of the lever L', pivoted at one end to the hoe and provided with an elongated slot in its free end, through which is inserted a bolt or rivet connected with the drag-bar, and a spring, M', secured at one end to an adjustable slide, $M^2$, the free end of said spring bearing upon the tapered end of said lever L', substantially as set forth.

6. The combination, with hoist-bar C', having cam $d'$, lever D', and cog-wheels E'' $e'$, of stud $f'$, pivotal plate F', lever G', and hinged plate R, provided with measuring devices, which connect with cam-wheel T, substantially as set forth.

In testimony that I claim the foregoing I have hereunto set my hand this 26th day of November, 1879.

ROMULUS P. LUDWIG.

Witnesses:
   J. M. LUDWIG,
   M. G. GROSS.